United States Patent
Bradley et al.

(10) Patent No.: US 9,499,150 B2
(45) Date of Patent: Nov. 22, 2016

(54) EMERGENCY BRAKING

(71) Applicant: KNORR-BREMSE RAIL SYSTEMS (UK) LIMITED, Melksham, Wiltshire (GB)

(72) Inventors: Ross Bradley, Melksham (GB); Rodney Miflin, Melksham (GB); Paul Hoy, Melksham (GB); Justin Peare, Melksham (GB)

(73) Assignee: Knorr-Bremse Rail Systems (UK) Limited, Melksham, Wiltshire (GB)

( * ) Notice: Subject to any disclaimer, the term of this patent is extended or adjusted under 35 U.S.C. 154(b) by 7 days.

(21) Appl. No.: 14/388,543

(22) PCT Filed: Mar. 26, 2013

(86) PCT No.: PCT/GB2013/000133
§ 371 (c)(1),
(2) Date: Sep. 26, 2014

(87) PCT Pub. No.: WO2013/144543
PCT Pub. Date: Oct. 3, 2013

(65) Prior Publication Data
US 2015/0307071 A1 Oct. 29, 2015

(30) Foreign Application Priority Data

Mar. 26, 2012 (GB) .................................. 1205305.4

(51) Int. Cl.
*B60T 13/26* (2006.01)
*B60T 13/68* (2006.01)
*B60T 13/66* (2006.01)
*B60T 17/22* (2006.01)
*B60T 15/02* (2006.01)

(52) U.S. Cl.
CPC ............ *B60T 13/683* (2013.01); *B60T 13/266* (2013.01); *B60T 13/665* (2013.01); *B60T 17/228* (2013.01); *B60T 15/021* (2013.01)

(58) Field of Classification Search
CPC .. B60T 13/266; B60T 13/665; B60T 13/683; B60T 17/228; B60T 15/021
USPC ........................................ 303/20, 22.6, 22.7
See application file for complete search history.

(56) References Cited

U.S. PATENT DOCUMENTS

| | | | | |
|---|---|---|---|---|
| 4,372,620 A * | 2/1983 | Mekosh, Jr. | ............... | B60T 8/74 188/181 A |
| 5,358,315 A * | 10/1994 | Balukin | ................ | B60T 13/585 303/15 |
| 5,944,391 A * | 8/1999 | Bezos | ................... | B60T 13/665 303/15 |
| 6,776,268 B2 * | 8/2004 | Hart | ........................ | B60T 13/26 188/153 R |
| 8,346,413 B2 * | 1/2013 | Storms | .................. | B60T 13/263 303/3 |
| 2004/0183364 A1 * | 9/2004 | Marsh | ........................ | B60T 7/02 303/7 |
| 2011/0153124 A1 * | 6/2011 | Storms | .................. | B60T 13/263 701/19 |
| 2016/0082939 A1 * | 3/2016 | Cole | ..................... | B60T 13/665 303/8 |

* cited by examiner

Primary Examiner — Thomas Irvin
(74) Attorney, Agent, or Firm — Stites & Harbison, PLLC; David W. Nagle, Jr.

(57) ABSTRACT

A brake system for a railway vehicle comprises a service brake with control valves and an emergency brake with a emergency brake valve adapted to permit or prevent emergency brake pressure from reaching the service brake control valves. The emergency brake is actuatable by a signal on an emergency brake wire. The brake system further comprises an isolating circuit adapted to permit or prevent control of the service brake control valves.

7 Claims, 8 Drawing Sheets

EMERGENCY BRAKING

The invention relates to emergency brake system for use in a railway vehicle.

Railway vehicle brake systems incorporate an emergency brake function so that the train can perform an emergency stop. Traditionally the emergency brake function has been provided by switching between a service brake control pressure and an entirely separate emergency brake control pressure by means of an electropneumatic selector switch so that the emergency brake pressure can be applied to the brake system relay valve. The emergency brake pressure is normally higher than the service brake pressure as it is designed to bring the train to a stop as quickly as possible. As applying such large pressures rapidly can lead to locking of the wheels and consequent damage, brake systems have also incorporated wheel slide control valves, which ameliorate these effects and in many cases will reduce the stopping distance. More recently an alternative architecture has been used, which comprises an emergency brake control valve in series with the service brake control valve, the emergency brake pressure will therefore be equal to the maximum permitted service brake pressure. In such a system the emergency brake pressure is always present and continuously monitored.

In such systems it is necessary to provide a safety interlock to protect the emergency brake function from the service brake function.

The known emergency brake systems use electronic interlocks that whilst effective require extensive and expensive testing to reach the required safety standards. In certain applications, electronic interlocks are undesirable and may in addition be less tolerant to certain failure modes.

The present invention seeks to provide an improved emergency brake system.

According to a first aspect of the invention there is provided a brake system for a railway vehicle, comprising service brake means comprising service brake control valves and emergency brake means, the emergency brake means comprising an emergency brake valve adapted to permit or prevent emergency brake pressure from reaching the service brake control valves, which emergency brake means is actuatable by a signal on an emergency brake wire, wherein the brake system further comprises an emergency solenoid and service brake control interlock valve, each of which is switchable by a signal on the emergency brake wire so as to permit emergency brake pressure to be reach the service brake control valves.

According to a second aspect of the invention there is provided a brake system for a railway vehicle comprising service brake means and wheel slide protection means, application of which service brake means and wheel slide protection means is controllable by one or more power switches, which power switches are located upstream of a service brake lockout, which service brake lockout is adapted to be actuated by an emergency brake signal to lockout the service brakes, brake pressure into the brake cylinders being further controllable by one or more solenoids located downstream of the service brake lockout.

The invention advantageously provides a solution in which the emergency brake application cannot be removed by the service brake and in particular one that is particularly tolerant to "wrong side" failures, that could affect the operation of the emergency brakes.

Exemplary embodiments of the invention will now be described in greater detail with reference to the drawings in which:

FIG. 1 shows the pneumatic architecture of an electropneumatic brake control valve. The valve has six main functional units: Primary Regulator, Secondary Regulator, Load Weigh Control, Brake Control Pressure Regulation (Axle 1 and 2), Link Valve, Emergency brake supply hold with auxiliary release.

Figure 1:
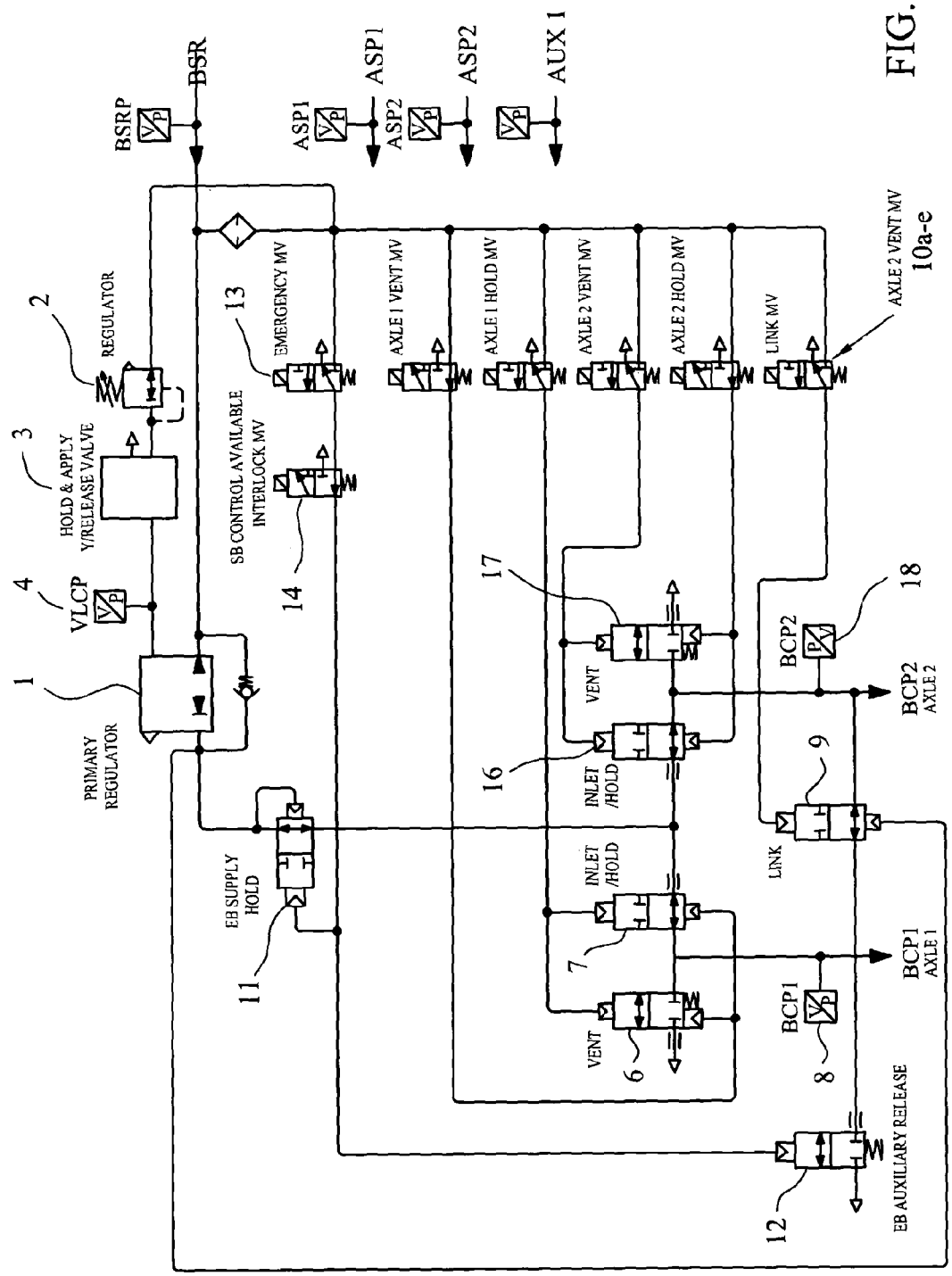
FIG. 1 shows the pneumatic architecture of an electropneumatic brake control valve.

The primary regulator 1 is a pressure regulator, which, in use, regulates the supply pressure from the reservoir and is adapted to regulate the pressure down to a level corresponding to a load weighted emergency brake pressure. It is also adapted to provide a mechanically derived emergency tare pressure in the event of failure of the electronic load weigh system.

The secondary regulator 2 is located upstream of the primary regulator 1, i.e. closer to the reservoir and is adapted to limit the maximum pressure that can be supplied to the brake cylinders to a level which does not exceed the emergency brake pressure of a crush-laden (maximum permitted load) vehicle.

The load weigh control pneumatics are located between the primary and secondary regulators and comprise a hold & application/release valve 3 and a pressure control transducer 4 to control the variable load control pressure (VLCP). The variable load control pressure supplies, in use, a control pressure to the primary regulator control valve 1. The control pressure is active during service braking, emergency braking and wheel slide protection. The control pressure will typically be proportional to the air suspension pressure provided to the valve unit. Two air suspension pressures ASP1 and ASP2 may be used when the unit is operating on a per bogie control basis.

The brake control pressure regulation comprises a hold 6,16 and vent valve 7,17 and a brake control pressure control transducer 8,18 for each of the two axles on the bogie. In use, these valves receive the output pressure from the primary regulator and regulating it to the required brake control pressure. These valves are also responsible for the pneumatic control of the brake cylinder pressure during wheel slide protection (WSP) activity.

The link valve 9 is pneumatically connected to the outputs of the brake cylinder pressure control valves and allows the respective brake cylinder pressure outputs to be pneumatically joined or separated. Typically during normal service and emergency operation the link valve 9 will be open allowing the pressures to be joined allowing per bogie control. During WSP activity, the two axles on each bogie will typically be isolated from one another. The brake control pressure on each axle is then independently controlled by a respective single pair of inlet/hold and vent solenoids (6,7 and 16,17, respectively) within this brake control pressure regulation part. The piloting of the brake control valves 6,7,16,17 and the link valve 9 is performed by respective pilot valves 10a-10e under control of the brake ECU described in more detail below.

The emergency brake hold valve 11 and auxiliary release valve 12 are fed with the same control pressure so their functionality is linked. Their function is to ensure a service brake demand is released or is prevented from being applied in the event of a loss of external or internal supply voltage to the brake control unit. This condition is normally referred to as 'fail to release'. The facility aids the recovery of trains in deep tunnel situations where a stranded train would represent a significant safety hazard. This function does not override the emergency brake.

The emergency brake is a high integrity function (SIL3) and is independent of the main brake control. The emergency brake train wire or brake demand is provided with a feed, which is set at the train control system nominal voltage, and a return, which is set at 0V. The control philosophy is to de-energise the input to demand emergency brake pressure and conversely to energise the input to release the emergency brake control pressure. The emergency brake functionality can thus be implemented through a combination of the valve pneumatics, load regulation and control interlocks with the service, WSP and remote release control functions previously described.

The output of the primary regulator 1 is passed to the emergency brake supply hold valve 11 which in the uncharged condition is pneumatically connected to the brake control valves. The status of the emergency brake supply hold valve 11 determines whether the internal emergency pressure relay valve 13 output is permitted or prevented from reaching the service brake control valves. When the valve 11 is in a state of hold, pressure downstream of the valve 11 is vented by the emergency brake auxiliary release valve 12, which is further in connection with the link valve 9. The hold and release valves are controlled by two solenoid valves, the service control available interlock 14 and the emergency relay 13. These two valves 13, 14 provide four possible states which enable the required failure state modes as follows:

| Local power supply | Emergency Brake | Emergency Brake Status | Comments |
| --- | --- | --- | --- |
| Off | Applied | Applied | Emergency = applied |
| Off | Released | Released | Power fail = release |
| On | Applied | Applied | Emergency = applied |
| On | Released | Applied | Normal Running |

Normal running means that the service brake and WSP valves control the brake pressure applied, if required. This can be from 0 Bar up to the available brake pressure.

Figure 2:
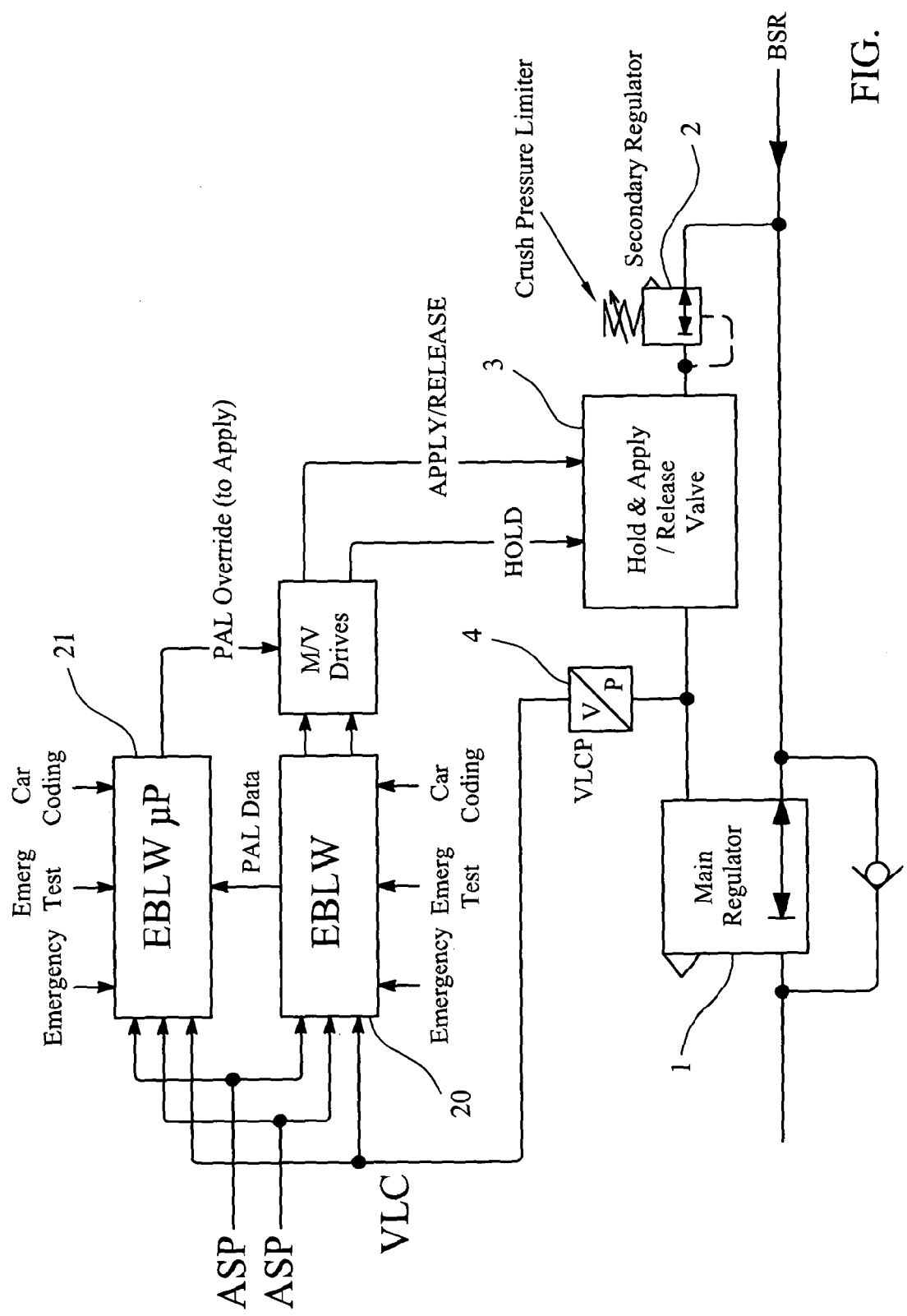
FIG. 2 shows the load weigh mechanism in further detail.

FIG. 2 shows the load weigh mechanism in further detail including the electronics, comprising a programmable logic device (PAL, CPLD, FPGA or similar) 20, microprocessor 21 and driver circuits 22. The output of the pressure transducer is fed to the programmable logic device, which is programmed to determine the required apply/release and hold valve commands based on the output of the pressure transducer as well as the air suspension pressure transducer outputs. The valve driver circuits convert the logic signals output by the programmable logic device 20 into signals required to drive the valves 3. The variable load control pressure controlled by these valves 3 is applied to the primary regulator 1 of the valve to generate the regulated pressure for the rest of the pneumatics.

The primary regulator 1 is adapted to ensure mechanically that the pressure does not drop below the minimum tare pressure regardless of the state of the load weigh control valves. The secondary pressure regulator 2, which is provided with a spring, ensures mechanically that the pressure does not exceed the crush-laden.

The load weigh programmable logic device 20 is monitored by a software function resident in the microcontroller 21, the function of which is equivalent to the programmable logic device 20. The software function compares its valve commands with those of the programmable logic device 20 and if there is a discrepancy, the microcontroller generates an override signal to override the programmable logic device signal output to the driver circuits. The effect of the override signal is to hold the solenoids 3 in their energised state, thereby forcing the control pressure to the crush level. This is achieved by the received override signal holding the solenoids in their energised state and the secondary pressure regulator ensures that only a crush level of pressure is applied.

The electronics main functions can be broken down into the following functional blocks: emergency brake demand; emergency signal; microprocessor WSP and service brake control function; selectors and a microprocessor watchdog.

The emergency signal block takes the digital vehicle electrical supply signal and converts it into two independent emergency signals, Emergency 1 and Emergency 2, both of which permit activity on both axles. The emergency signal functions optically isolate the low voltage emergency signals from the high voltage emergency input. The functions also provide a test facility that simulates an emergency brake demand. Each emergency signal block can be further subdivided into the following sub-blocks: level translator, emergency test and emergency signal generator. The level translator sub-block converts the vehicle electrical supply input signal down to 5V to switch on the optical isolator that connects to the emergency signal generator circuits. In an emergency the optical isolator is switched off. Each emergency signal generator sub-block receives an input from the level translator sub-block through an optical isolator.

In emergency braking, the WSP control is operational in the microprocessor. If the braking is not being controlled by WSP (i.e. there is no wheel slide), the microprocessor WSP channel outputs will default to 0V to thereby enable the emergency brake pressure to be applied. However, if the wheels have gone into slide, then normal WSP control will automatically take place as this should shorten the stopping distance.

The selectors switch the output from the microprocessor from the service brake to WSP channels. Each emergency signal independently switches the corresponding axle control to the WSP channel. The brake channels further comprise a service brake interlock and an emergency brake interlock.

The service brake interlock is used to apply the service brake default once the microprocessor watchdog has tripped due to a microprocessor malfunction during service braking or WSP operation. The service brake interlock does not affect emergency braking during normal conditions.

The microprocessor watchdog monitors the microprocessor continuously. In the event that the watchdog detects a fault, the microprocessor is reset and if the reset occurs during emergency braking, the emergency brake interlock is triggered, which imposes an inlet command on the brake control channel thereby allowing maximum regulated air pressure into the brake cylinders. The emergency brake interlock sets the valve commands to the brakes applied state in the event of a low brake supply reservoir being detected or if the watchdog detects a microprocessor malfunction.

Figure 3:
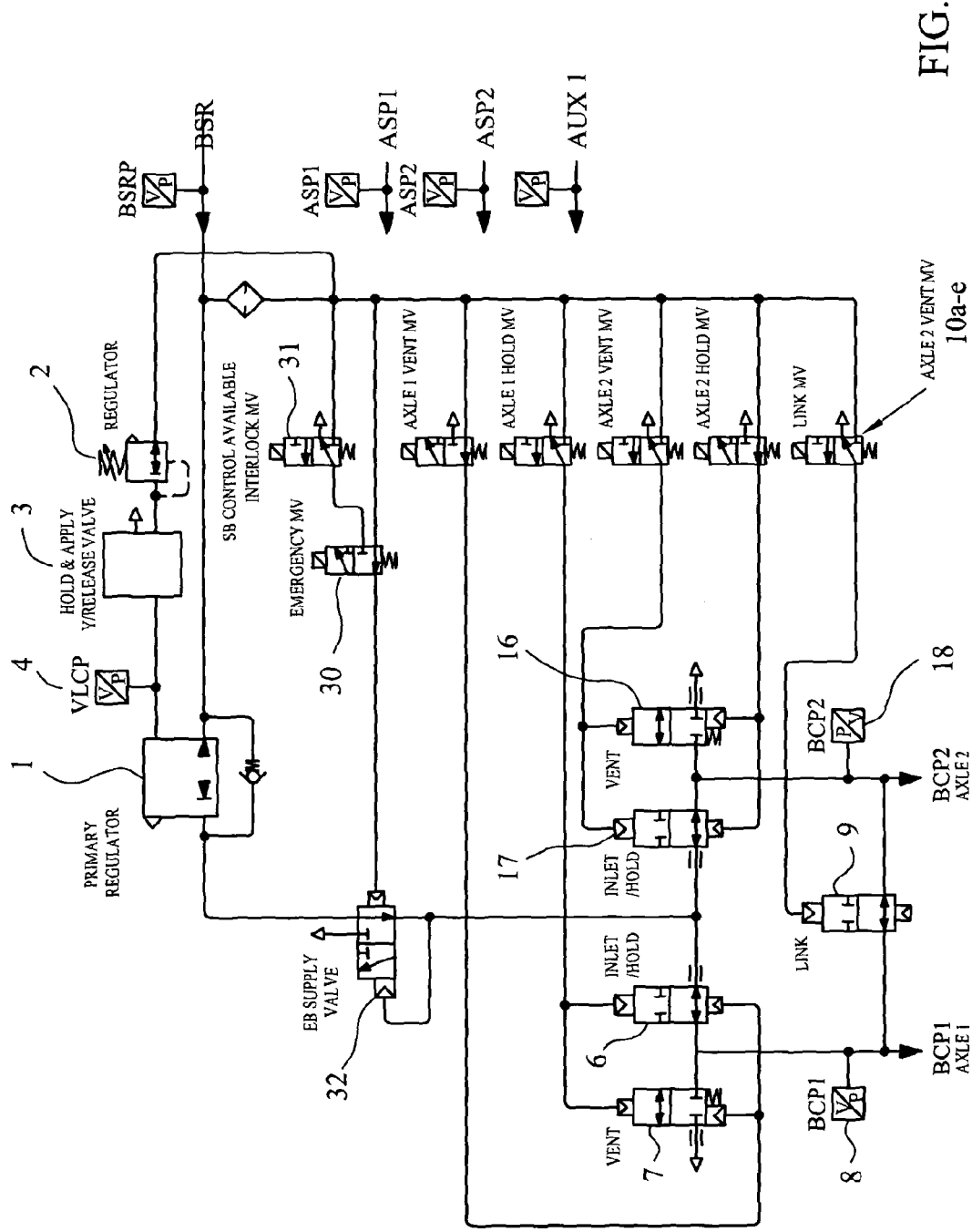
FIG. 3 shows an alternative arrangement using a diaphragm valve with 3/2 function replacing the two poppet valves 11 & 12

FIG. 3 discloses an alternative arrangement using a diaphragm valve 32 in place of the poppet valves 11 & 12 shown in FIG. 1. In the arrangement of FIG. 3, the emergency magnet valve 30 is placed downstream of the service brake interlock valve 31 with a second input by passing the service brake interlock valve 31. The Emergency Brake Supply valve 32, which replaces the emergency brake supply hold valve 11, is of 3/2 configuration with its own vent so that an emergency release valve is no longer required.

The status of the emergency brake supply valve 32 determines whether the internal emergency pressure relay valve output is permitted or prevented from reaching the service brake control valves 6,7, 16,17. When in a state of Hold, pressure downstream of this valve is vented. This valve 32 is controlled by the service brake interlock valve 31 and emergency valve 30. These solenoid valves are switched by the local power supply and the emergency brake wire. The service brake interlock valve 31 and emergency valve 30 provide four possible states which enable the required failure state modes as follows:

| Local power supply | Emergency Brake | Emergency Brake Status | Comments |
|---|---|---|---|
| Off | Applied | Applied | Emergency = applied |
| Off | Released | Released | Power fail = release |
| On | Applied | Applied | Emergency = applied |
| On | Released | Applied | Normal Running |

Figure 4:
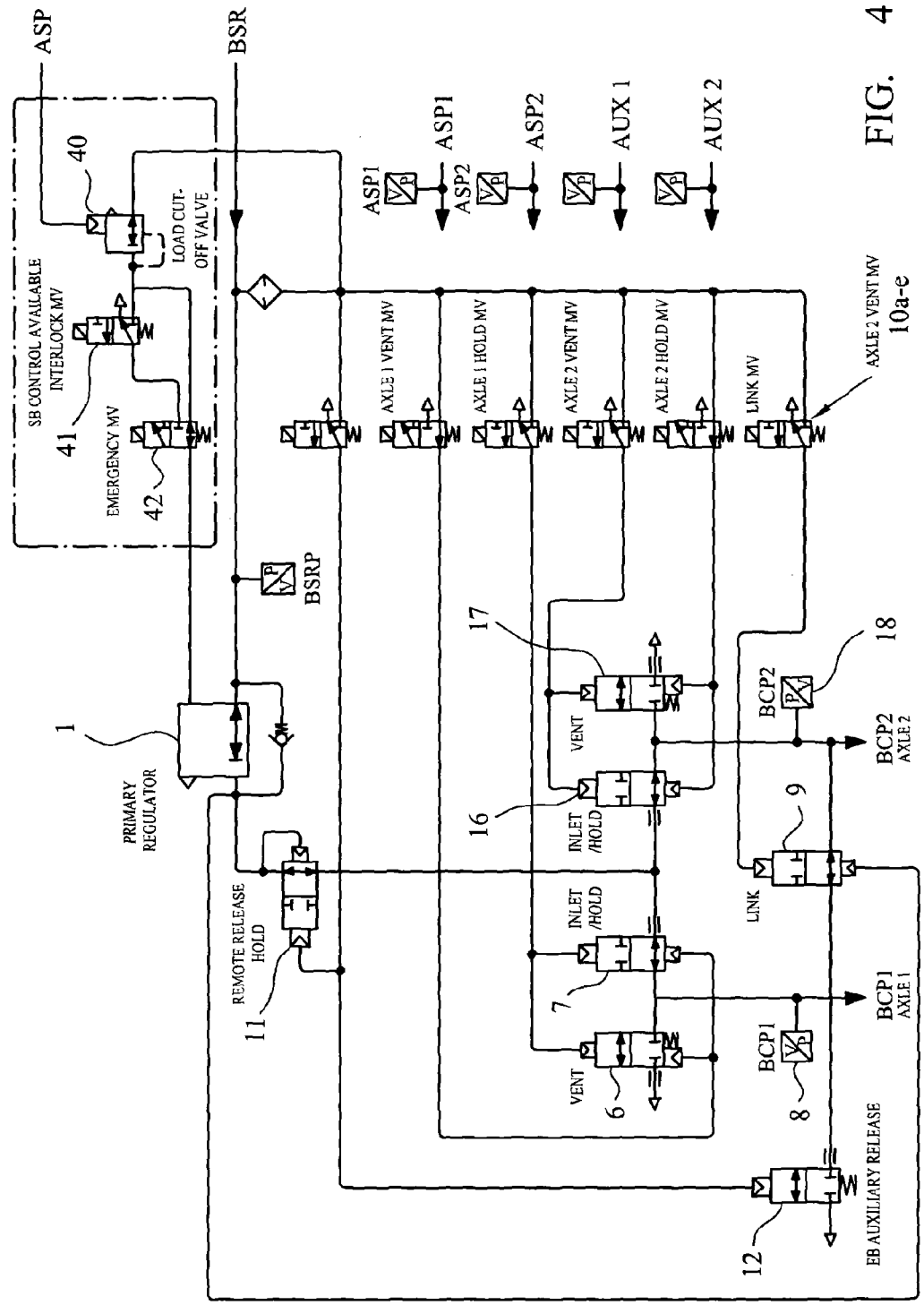
FIG. 4 shows a further embodiment in which the load weigh function is moved to an external pneumatic only valve.

FIG. 4 relates to a further embodiment in which the load weigh function is moved to an external pneumatic only valve and two external solenoids provide the emergency and 'fail to release' states by applying and releasing pressure on a purely pneumatic primary regulator.

The brake control valve differs in this arrangement from the valve disclosed in FIG. 1 in the following aspects: the primary regulator mechanically derived emergency tare pressure and electronic load weigh functionality is removed; valves 11 & 12 are termed remote release hold and remote release vent. Their functionality is to provide an optional means of release of a service brake demand from an external source. Their control is via solenoid valve 43.

The external load cut-off valve 40 receives inputs from the brake supply reservoir BSR and the air suspension pressure ASP. The output of the load cut off valve 40 is connected to the control chamber of the primary regulator 1 via two external solenoids. The service brake control interlock solenoid 41 which is fed from the load cut off valve and the emergency solenoid 42 which receives inputs from the load cut off valve and the service brake interlock solenoid 41. The solenoids are switchable by the local unit power supply and the emergency brake wire. The two valves 41,42 again provide four possible states which enables the required failure states modes as follows:

| Local power supply | Emergency Brake | Emergency Brake Status | Comments |
|---|---|---|---|
| Off | Applied | Applied | Emergency = applied |
| Off | Released | Released | Power fail = release |
| On | Applied | Applied | Emergency = applied |
| On | Released | Applied | Normal Running |

This arrangement is advantageous in that in the power fail condition, the load weigh correction stays fully operational because it is purely pneumatic.

Figure 5:
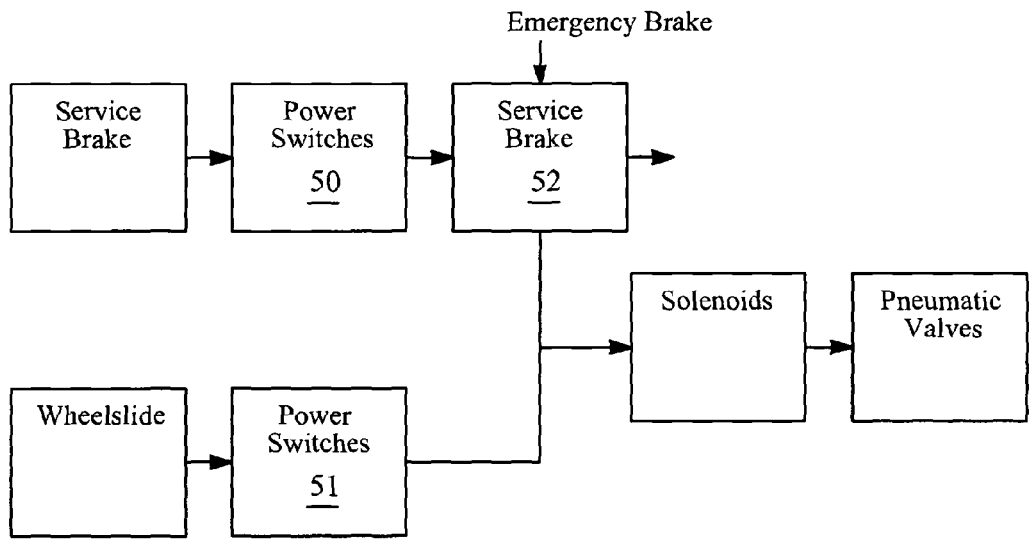
FIG. 5 shows schematically the architecture of the emergency lock out of the service brake system.

FIG. 5 shows schematically the architecture of the emergency lock out of the service brake system. In the arrangement according to an aspect of the invention, the application of the service brakes and the application of the wheelslide protection is controlled by means of respective power switches 50, 51. These power switches are located upstream of a service brake lock out 52, which can be triggered by an emergency brake signal to lock out the service brakes and apply the emergency brake pressure. The signal from the wheel slide protection and the service brake/service brake lock out is fed to solenoids (6,7,16,17) adapted to control the application of pressure into the brake cylinder valves.

Figure 6:
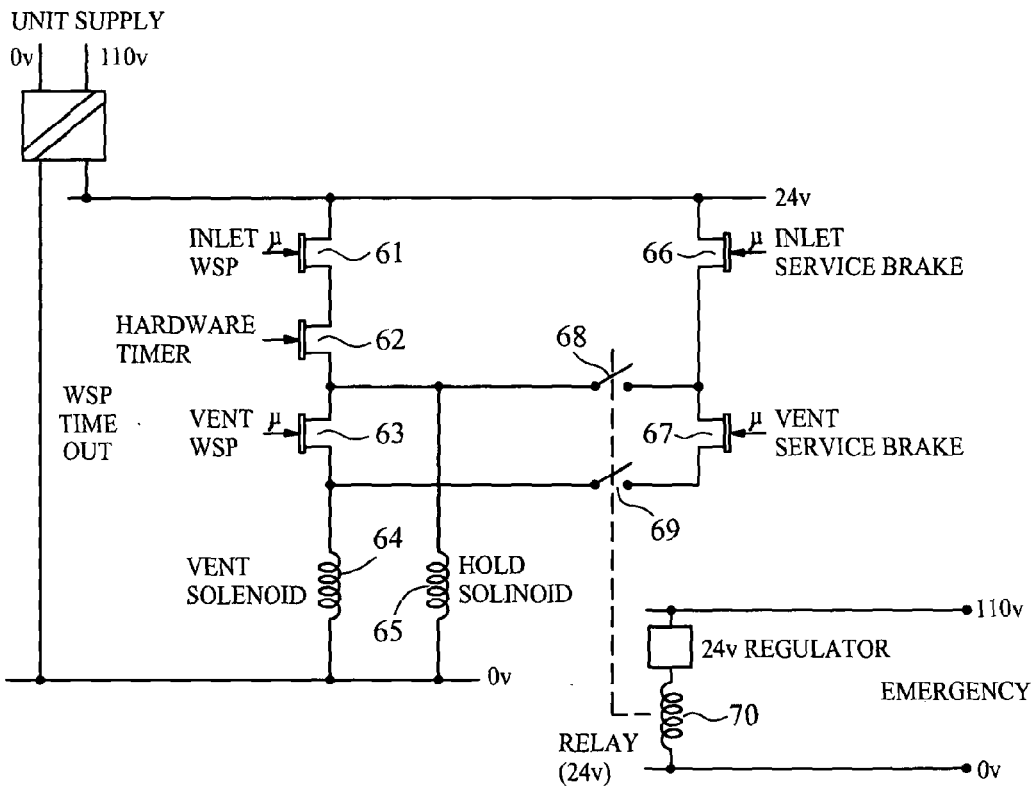
FIG. 6 shows an electrical circuit diagram for the lock out.

FIG. 6 shows the electrical circuit diagram for the emergency lock out of service brake control for the arrangements shown in FIGS. 1 and 3 with the inlet WSP 61, WSP timer 62 and WSP Vent FETs 63 arranged in series with the vent solenoid 64 and the inlet and timer FETs in series with the hold solenoid 65. In parallel thereto are arranged the service brake inlet 66 and vent FETs 67. Power switches 68,69 are located between the respective outputs of service brake inlet 66 and vent FETs 67 and the output of the timer 62 and WSP vent 63 FETs respectively. Operation of the switches 68,69 is controlled using a relay 70, which can be either a solid state relay or a traditional relay. In this arrangement the safety interlock which isolates the service brake control whilst the emergency brake is active is advantageously on the output side of the power switches. This has the benefit that fewer components are located between the interlock and the solenoids. It also enables the safety related section of the circuit to be more easily identified for safety analysis and justification.

Figure 7:
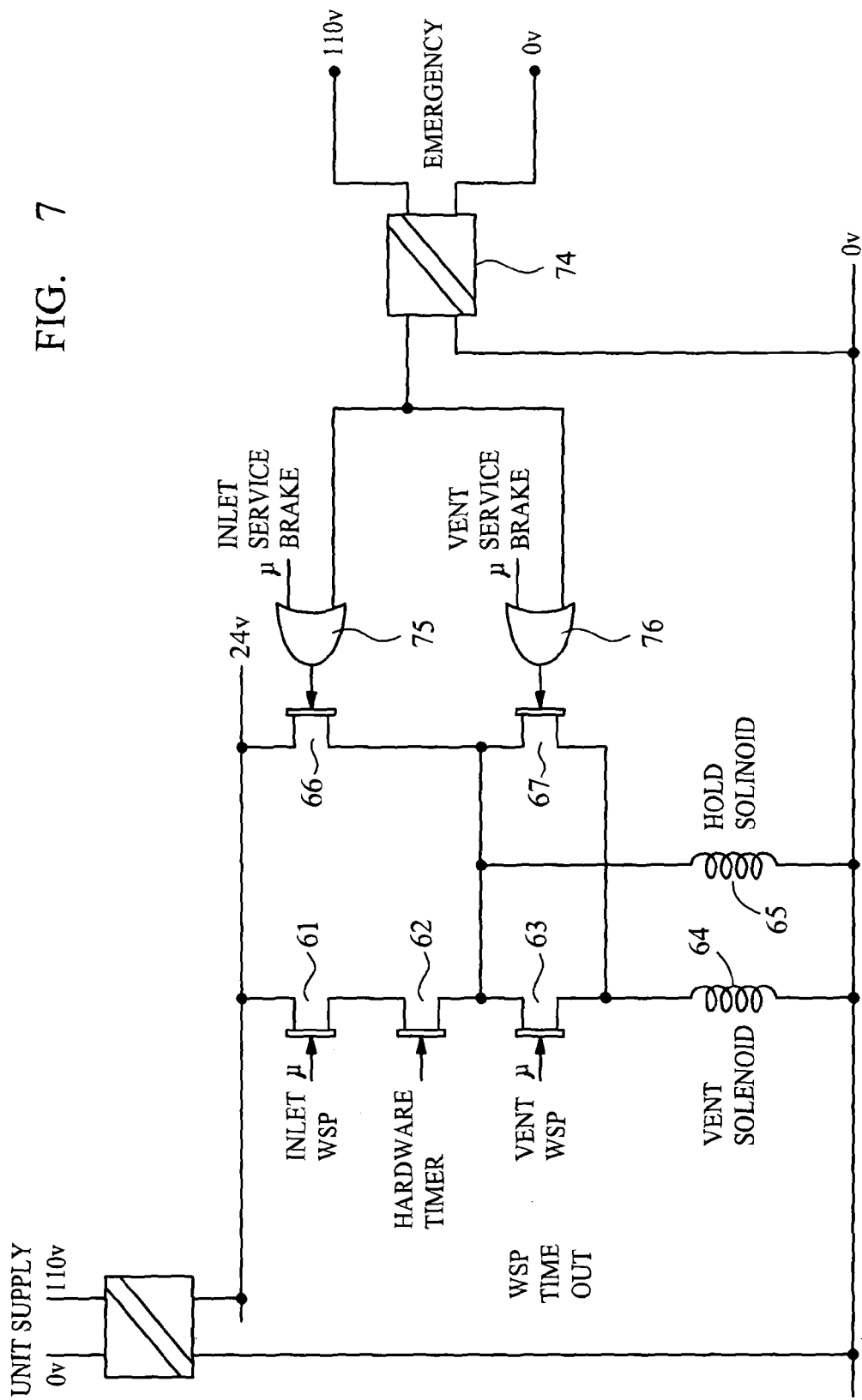
FIG. 7 shows an alternative electrical circuit

FIG. 7 shows an alternative circuit diagram suitable for use with the arrangements of FIGS. 1 and 3 where operation of the service brake inlet and vent FETs (66 and 67) is permitted or prevented by electronic hardware (75 and 76) dependent on the emergency signal via the isolating circuit 74. The isolating circuit 74 may be one or more isolating circuits of any known mechanism (such as optoelectronic, mechanical, magnetic) which follows the emergency input. This arrangement benefits from requiring fewer mechanical components.

Figure 8:
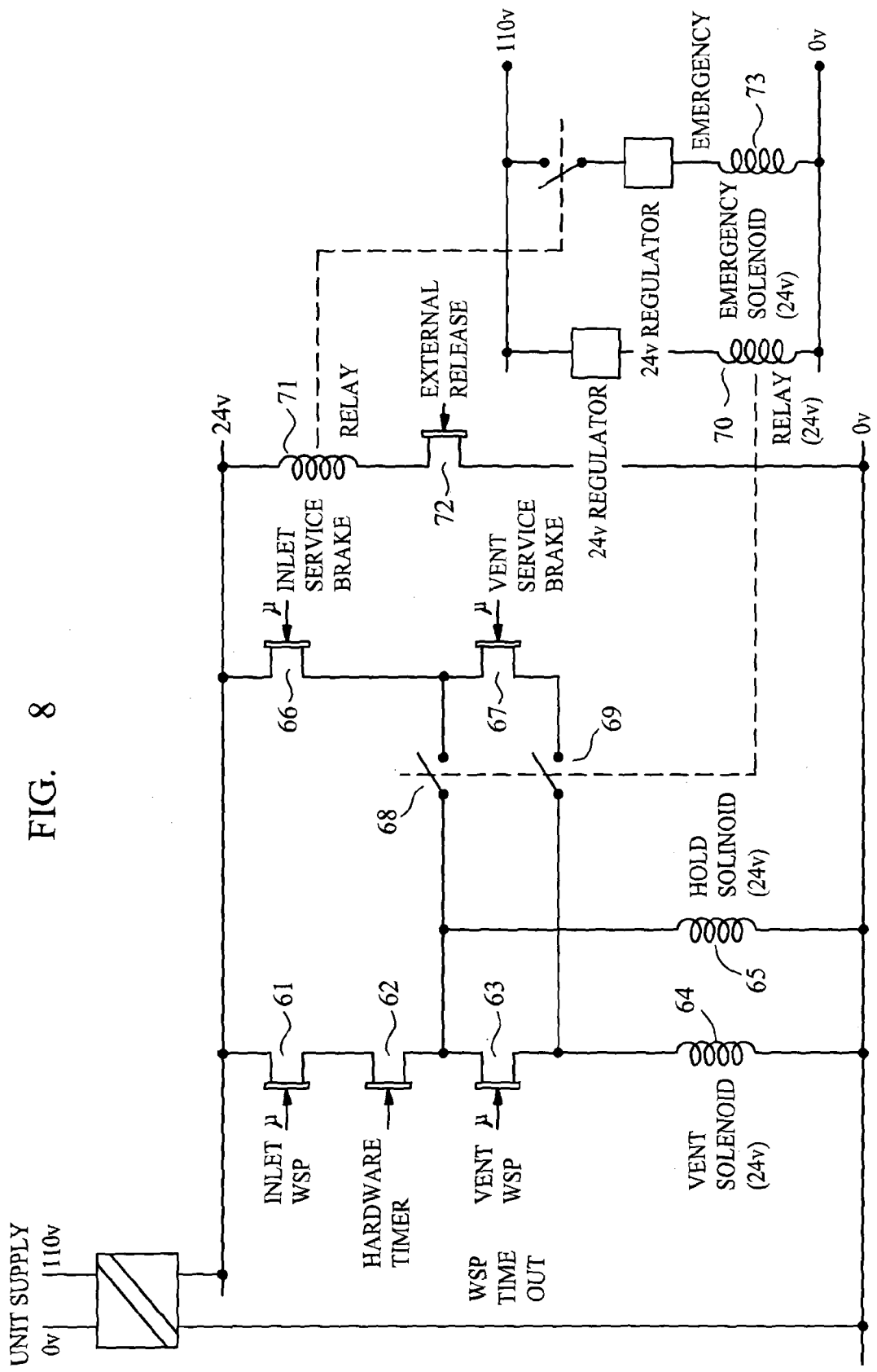
FIG. 8 shows a further alternative electrical circuit

FIG. 8 shows an arrangement suitable for use with the arrangement of FIG. 4 which provides the emergency lock out of service brake control but provides a means of achieving the 'fail to release' condition in the event of loss of local power supply. This is achieved with relay 71 and emergency solenoid 73. Solenoid 73 provides the pneumatic control to remote release valves 11 & 12. Additionally in this arrangement, FET 72 may be switched from an external source to provide a service brake release independent of local unit supply with a relay 71 and solenoid valve 73.

Figure 9:
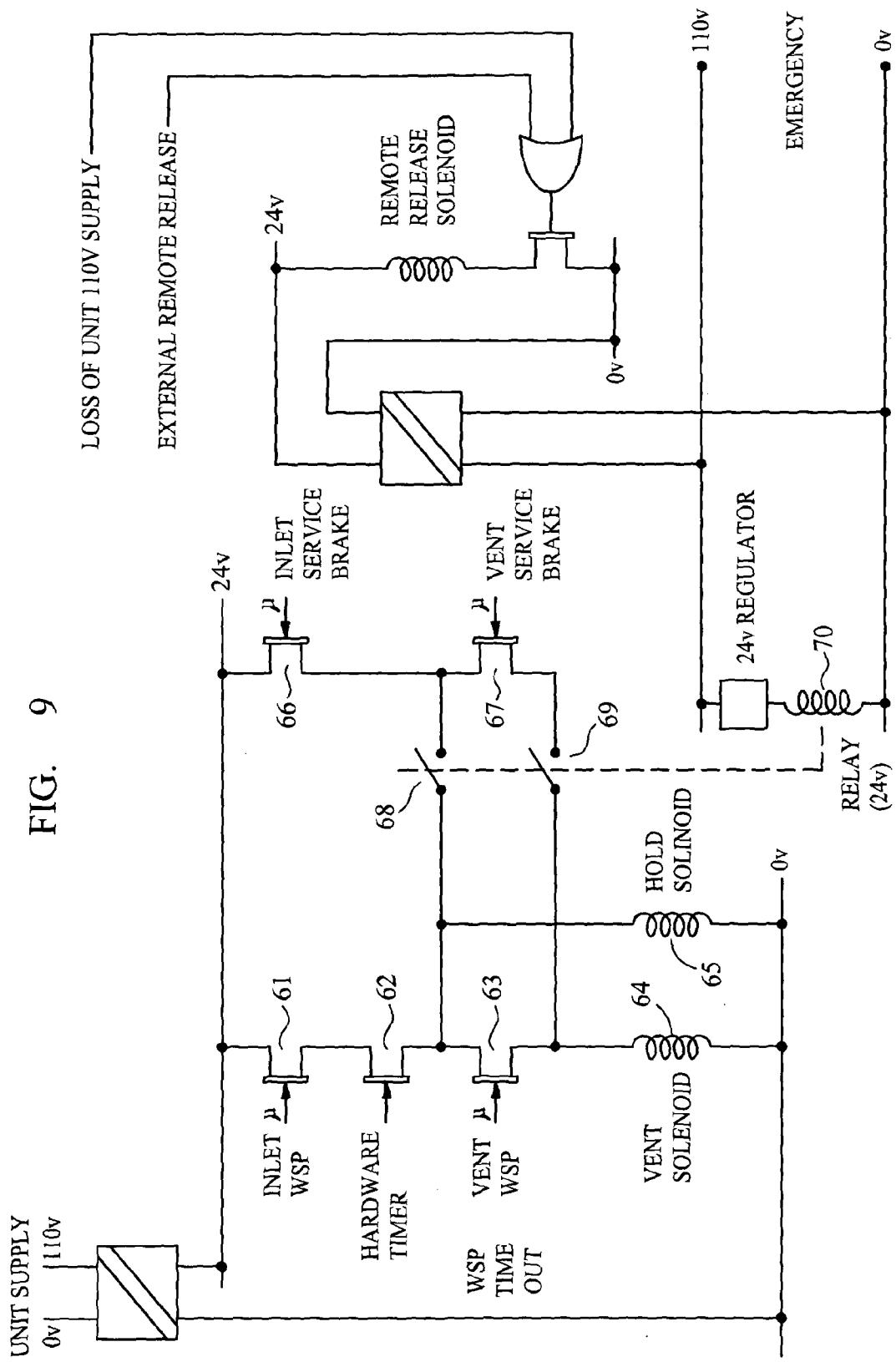
FIG. 9 shows a further alternative electrical circuit

As a further alternative to that of FIGS. 6, 7 and 8, the local power supply failure could be arranged internally in the brake control unit. In this case the control logic is powered off the emergency line. The circuit for this arrangement is shown in FIG. 9.

The invention claimed is:

1. A brake system for a railway vehicle, the brake system comprising service brake means, which service brake means comprise service brake control valves (6, 7, 16, 17) and emergency brake means, the emergency brake means comprising an emergency brake valve (11, 32, 42) adapted to permit or prevent emergency brake pressure from reaching the service brake control valves (6, 7, 16, 17), which emergency brake means is actuatable by a signal on an emergency brake wire, wherein the brake system further comprises an isolating circuit adapted to permit or prevent control of the service brake control valves (6, 7, 16, 17), characterised in that the isolating circuit comprises an emergency solenoid and service brake control interlock valve (14, 31, 41), each of which is switchable by a signal on the emergency brake wire so as to permit or prevent emergency brake pressure to reach the service brake control valves (6, 7, 16, 17).

2. The brake system according to claim 1, wherein the service brake control valves (6, 7, 16, 17) are each electronically controlled in dependence on the signal on the emergency brake wire via the isolating circuit.

3. The brake system for a railway vehicle according to claim 1, wherein the brake system further comprises wheel slide protection means, application of the service brake means and wheel slide protection means being controllable by one or more switches (50, 51), which switches (50, 51) are located upstream of a service brake lockout (52), which service brake lockout (52) is adapted to be actuated by an emergency brake signal to lockout the service brakes, brake pressure into the brake cylinders being further controllable by one or more solenoids located downstream of the service brake lockout.

4. The brake system according to claim 1, wherein the isolating circuit comprises a relay (71) operable in conjunction with a further solenoid (73) to achieve a fail to release state in the event of loss of power.

5. The brake system according to claim 4, wherein a FET (72) is provided, which FET is switchable by means of an external power source to provide a service brake release.

6. The brake system according to claim 1, wherein the power supply for control of the service brake control valves (6, 7, 16, 17) is controlled on the emergency line.

7. The brake system according to claim 1, wherein the emergency brake pressure is demanded by de-energising an input valve and released by energising the input valve.

\* \* \* \* \*